United States Patent
Boulandet et al.

(10) Patent No.: US 6,684,273 B2
(45) Date of Patent: Jan. 27, 2004

(54) AUTO-ADAPTIVE JITTER BUFFER METHOD FOR DATA STREAM INVOLVES COMPARING DELAY OF PACKET WITH PREDEFINED VALUE AND USING COMPARISON RESULT TO SET BUFFER SIZE

(75) Inventors: Patrick Boulandet, Strasbourg (FR); Jean-Marc Zaun, Lingolsheim (FR); Rodolphe Querelle, Meistratzheim (FR); Philippe Burger, Mutzig (FR)

(73) Assignee: Alcatel, Paris (FR)

( * ) Notice: Subject to any disclaimer, the term of this patent is extended or adjusted under 35 U.S.C. 154(b) by 364 days.

(21) Appl. No.: 09/833,569

(22) Filed: Apr. 13, 2001

(65) Prior Publication Data
US 2002/0007429 A1 Jan. 17, 2002
(Under 37 CFR 1.47)

(30) Foreign Application Priority Data
Apr. 14, 2000 (EP) .............................. 00440102

(51) Int. Cl.⁷ .......................... G06F 13/20; G06F 13/28
(52) U.S. Cl. ........................ 710/52; 710/33; 710/35; 710/29; 710/30; 710/56; 711/170
(58) Field of Search .................. 710/29, 30, 33, 710/35, 52, 56; 711/170

(56) References Cited

U.S. PATENT DOCUMENTS

| | | | |
|---|---|---|---|
| 4,604,717 A | | 8/1986 | Kaplan |
| 5,652,627 A | | 7/1997 | Allen |
| 5,916,309 A | * | 6/1999 | Brown et al. .................. 710/52 |
| 5,974,518 A | | 10/1999 | Nogradi |
| 5,996,031 A | | 11/1999 | Lim et al. |
| 6,360,271 B1 | * | 3/2002 | Schuster et al. ............. 709/231 |
| 6,385,673 B1 | * | 5/2002 | DeMoney ..................... 710/60 |
| 6,438,604 B1 | * | 8/2002 | Kuver et al. ................. 709/234 |
| 6,487,196 B1 | * | 11/2002 | Verthein et al. ............. 370/352 |
| 6,487,603 B1 | * | 11/2002 | Schuster et al. ............. 709/231 |

FOREIGN PATENT DOCUMENTS

| | | | | |
|---|---|---|---|---|
| JP | 35715912 A | * | 10/1982 | ........... H04Q/11/04 |
| WO | WO 97/39409 | | 10/1997 | |

* cited by examiner

Primary Examiner—Rehana Perveen
(74) Attorney, Agent, or Firm—Sughrue Mion, PLLC

(57) ABSTRACT

A method to buffer a data stream at its reception, performed by a receiver of the data stream. Data sent by a sender is transferred over a connection-less network in packets encapsulated into frames. The method of buffering itself includes the steps of storing the packets into a buffer of a specific size ($B_s$). When the receiver received at least one of the packets, its delay (jitter) is measured and compared with some predefined value. Depending on the result of that comparison, said buffer size ($B_s$) will be adapted dynamically such to optimize the transfer of the packets according to some predefined criteria.

10 Claims, 1 Drawing Sheet

AUTO-ADAPTIVE JITTER BUFFER METHOD FOR DATA STREAM INVOLVES COMPARING DELAY OF PACKET WITH PREDEFINED VALUE AND USING COMPARISON RESULT TO SET BUFFER SIZE

BACKGROUND OF THE INVENTION

The present invention relates to a method of buffering a data stream at its reception as set forth in the preamble of claim 1.

In a circuit switching network as actual telephony network, every connection is set-up by blocking a single channel or fixing some bandwidth per connection. Such channel will be release as soon as the users decide to terminate the call. Due to the reservation of bandwidth during the complete call, the quality of the call is predictable. But this type of network has also disadvantages. At first, every connection must be set-up which consumes time and resources. Secondly, every connection has a fixed bandwidth allocated (usually 64 kbps). A user can not ask for more or less bandwidth. Even during silence periods, the resources are used completely. Further unused circuit are unused capacity. Circuit switching does not provide easily the capability to fill this unused capacity with elastic traffic.

All these explains, among others, the interest to use internet protocol (IP) networks to perform usual telecommunications connections. There, no connection must be set-up. Such networks are therefore called connection-less or packet-switched networks. No resources are allocated and connectivity is already provided by IP. In that case the data (audio like voice or video messages) are transferred over that network as data stream made of packets encapsulated into frames. The packets will mostly follow different routes through the network, what will result in different not necessarily predictable delays (jitter delay) between them. Furthermore, the time taken to insert these packets into a network (time access) will vary a lot according to how busy this network will be. This is in fact the main cause of jitter delay. It may even vary substantially during a same telecommunications. This delay is intrinsic to the technology used like e.g. in a LAN ethernet the Carrier Sense Multiple Access/Collision Detect.

Voice over IP (VoIP) is a typical application using such network and requesting a high level of quality of service (QoS). A real time communications between a sender and a receiver will then be possible only if such requirement of QoS will be fulfilled. Therefore, it is crucial to control and minimize all delays occurring on such a network. This is obtain among other by storing at the receiver some amount of received data in a buffer before restituting it (timestamp-dejittering). In such a way it is possible to rebuild the data stream with the same sequence of packets as when the data stream left the sender.

The delays occurring on a packet-switched network are mostly of two nature, one fixed due to the speed of the stream on that network, and the other variable (jitter) due to the chosen path and mostly to the amount of the already present traffic in that network. Since latter can change a lot from a communication to another or even during a communication e.g. due to some overload of the network at some special hours of the day, it is of interest to adapt some characteristics of the used buffer to the circumstances.

In WO97/39409 is disclosed a communications system utilizing a buffer of variable size. That invention is developed in the field of native processing environment modems such to permit to adapt the software controlling the modem to the constraints of changing standards (e.g. V.32 and V.34). Two different buffer sizes are available. The choice is made according to the latency time period desired. There, small buffers will provide the communication system with short and accurate response times. On the other hand, increasing the buffer size will make the modem processing more robust, reducing the implementation overhead, making it more resistant to operating system latencies and giving it greater flexibility in the exact time within the time slice i.e. between interruptions occurring during processing without necessarily disturbing the transferred data stream.

The available sizes for the buffer are already predefined in WO97/39409. Therefore, the choice of the buffer size is very restricted in fact to only two values. Furthermore, the switching from one buffer size to the other one is performed in a fixed manner at some definite time identical for all communications. This method is absolutely not adequate if high QoS is demanded for a transfer of data stream on a packet-switched network where the delay (jitter) of each packet sent through it may be different and not predictable.

SUMMARY OF THE INVENTION

It is an object of the present invention to optimize the reception quality in a connection-less network such that real time telecommunications with a very high QoS are possible.

This object is attained, according to the invention, by a method of buffering a data stream at its reception as claimed in claim 1.

To overcome the problem of the non-predictable delay taken by the packets when inserted into a packet-switched network and transferred over one almost randomly chosen path of that network, it is of great advantage to store temporarily part of the data stream at its reception on the receiver. This is performed using a buffer of specific size where the packets will be store and classified in the right order. Indeed, the delay taken by different packets can be so different that some packets may reach the receiver before other packets sent first by the sender.

The size of that buffer must be chosen such that it is big enough to permit to rebuild at the receiver the same data stream as the one leaving the sender. On the other hand, this buffer size must be kept as small as possible so not to provoke any audible scrambling or chopping. Advantageously, the method according to the invention comprises the steps of measuring regularly the delay (jitter) of at least one packet when reaching the receiver. Afterwards, said measured delay is compared in some way with a predefined delay obtained e.g. by some averaged estimation of the time taken by several packets for the transfer on that network. And finally, the result of that comparison is used to adapt regularly the buffer size. If, for example, the measured delay is much bigger than the estimated one, it will be a hint that with such to small buffer some packets will get lost. Therefore, the method according to the present invention comprises the step of taking an action onto the size of the buffer i.e. in that case the possibility to increase that buffer size. On the other hand, if the measured delay is much smaller than the estimated one, it will be a hint that the buffer size has to be reduced increasing then also the QoS of the performed telecommunications over such packet-switched network.

An embodiment of said method of buffering according to the present invention is characterized in that the action on the buffer size is taking following some predefined criteria.

Latter consists of several different cases to which the result of the performed comparison shall be affected according to its value, and which will imply a change or not of the buffer size. Such step is advantageously applied regularly so to provide a dynamic adaptation (auto-adaptive) of the buffer size to the present circumstances of the network. The different sizes of the buffer are not predefined but rather completely variable and limited at last by the unity used for storing said data into said buffer.

BRIEF DESCRIPTION OF THE DRAWINGS

Further advantageous features of the invention are defined in the dependent claims and will become apparent from the following description and the drawing.

One embodiment of the invention will now be explained in more detail with reference to the accompanying drawing, in which.

DETAIL DESCRIPTION OF THE INVENTION

Figure 1:
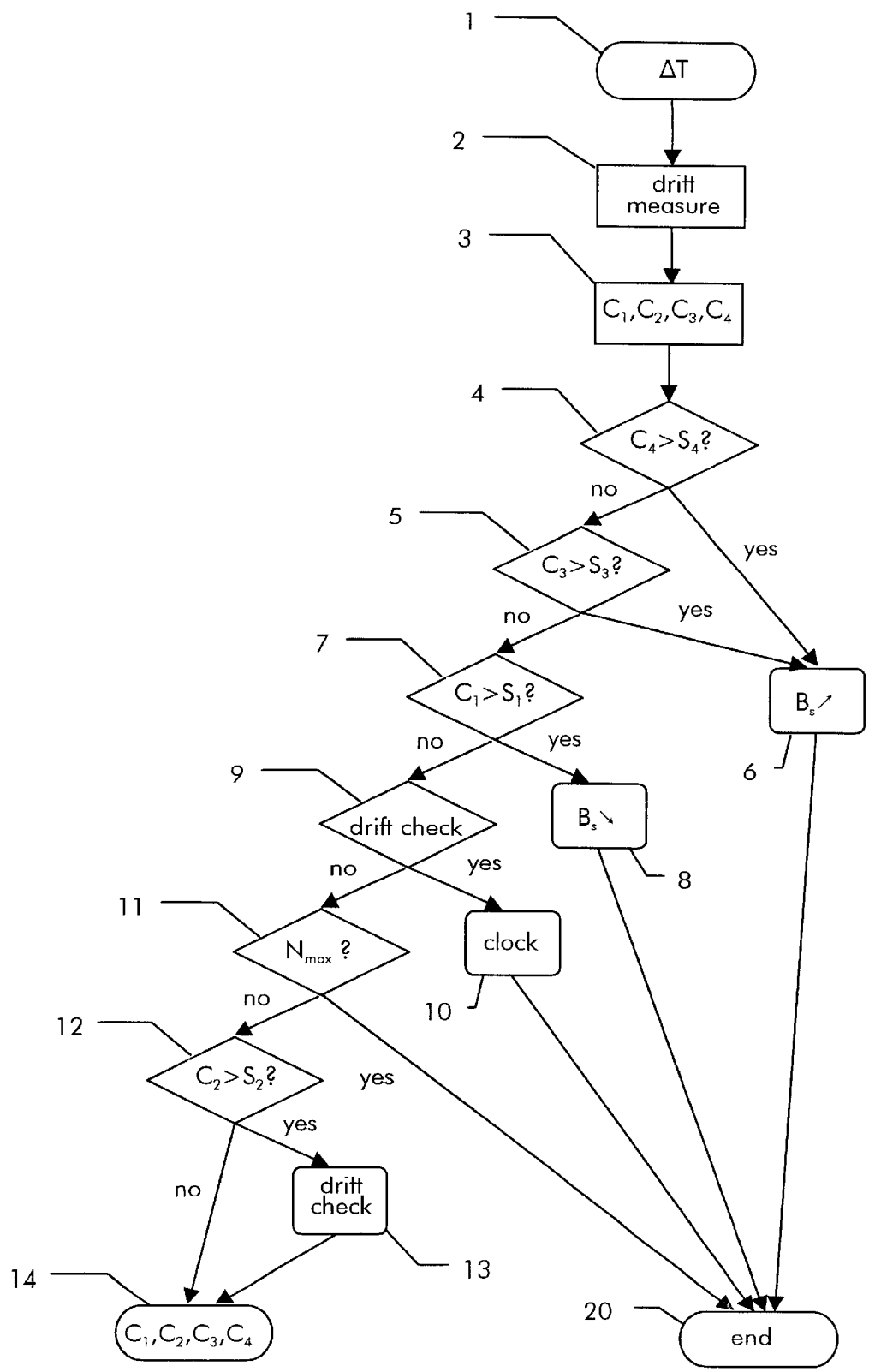
FIG. 1 is a flow chart showing steps of a method of buffering a data stream at its reception according to the invention.

The present invention concerns a method to buffer a data stream at its reception.

The method is performed by a receiver of said data stream. Latter sent by a sender is transferred over a connection-less network (packet-switched network) in packets encapsulated into frames. The method of buffering itself comprises the steps of storing said packets into a buffer of a specific size ($B_s$).

When said receiver received at least one of said packets, its delay (jitter) is measured and compared with some predefined value. Depending on the result of that comparison, said buffer size ($B_s$) will be adapted dynamically such to optimize said transfer of said packets according to some predefined criteria specified later on in this description.

The step concerning said comparison can be performed in different ways. In a preferred embodiment of the present invention a measured time difference $\Delta T$ between the real time and the expected one for said transfer of said packet is compared with a maximum admissible time difference $\Delta_M$ which corresponds to said buffer size $B_s$.

The received packets or frames are then classified relatively to the result of said comparison according to some predefined criteria such to weight said different cases $C_i$ relatively to the number of time a result of said comparison was affected to one of said cases. The predefined criteria consist of at least three different cases. A first one (i) corresponding to the situation that said measured time difference $\Delta T$ is noticeably less then said maximum admissible time $\Delta_M$, a second one (ii) corresponding to the situation that both are of same amplitude, and a third one (iii) corresponding to the situation that said measured time difference $\Delta T$ is noticeably greater then said maximum admissible time $\Delta_M$.

In a further embodiment said predefined criteria consists of four cases. There is a supplementary case when the measured time difference $\Delta T$ is a little less then said maximum admissible time $\Delta_M$. The different predefined cases are then defined as follow:
1. $\Delta T \ll \Delta_M$
2. $\Delta T < \Delta_M$
3. $\Delta T \sim \Delta_M$
4. $\Delta T > \Delta_M$ For practicability, two coefficients are introduced $\Delta_1$ and $\Delta_2$ such to clearly defined the four above cases to which are respectively affected four comparators with four counters $C_1$, $C_2$, $C_3$, and $C_4$ in the following way:
1. $\Delta T < \Delta_1 \rightarrow C_1$
2. $\Delta_1 < \Delta T < \Delta_2 \rightarrow C_2$
3. $\Delta_2 < \Delta T < \Delta_M \rightarrow C_3$
4. $\Delta T > \Delta_M \rightarrow C_4$ These two coefficients $\Delta_1$ and $\Delta_2$ are defined such that $\Delta_1$ is noticeably less then said maximum admissible time $\Delta_M$ ($\Delta_1 \ll \Delta_M$), and $\Delta_2$ is only little less then said maximum admissible time $\Delta_M$ ($\Delta_2 < \Delta_M$). The counters $C_1$ to $C_4$ are used to count the number of packets (weight) affected to each of these four cases.

To each of these four comparators is defined a threshold parameter respectively $S_1$, $S_2$, $S_3$ and $S_4$. They are used to define when a step of taking an action will be activated. Typically, when the counter $C_1$ exceeds the value $S_1$, then the buffer size $B_s$ ($\Delta_M$) will be reduced of some amount.

If the counter $C_2$ exceeds the value $S_2$, then a check is performed of a possible time-lag between the sender and the receiver. An increase of the fixed delay for any transmission may be agreed between them. A resynchronization of the clock of both sender and receiver are performed such that in a same interval of time, a same amount of data is at least approximately transmitted by said sender as received by said receiver. Usually the clock of the sender will be taken as the reference and therefore, it is the clock of the receiver which must be adapted to the former.

In the third case when the counter $C_3$ exceeds the threshold $S_3$, the buffer size $B_s$ is increased. The same action may be taken in the fourth case when the counter $C_4$ will exceed the threshold $S_4$. These two last cases are not redundant since in the fourth case, a non null counter $C_4$ is tolerated. Therefore a percentage of lost of data will be accepted when the packets are stored or gathered into the buffer. This is not the case in the third one, since that counter $C_3$ counts the number of packets or frames stored in the buffer till its completely fullness but without any loss.

On FIG. 1 is shown a flow chart that depicts an example of the method of buffering a data stream at its reception according to the invention. Such kind of procedure is implemented on the receiver side. The method starts when the receiver received a frame or packet out of the data stream sent by the sender, and stores or gathers it into a buffer. At first, the measured time difference $\Delta T$ between the real time and the expected one for said transfer of said packet is calculated 1. Afterwards, a drift or difference between said value $\Delta T$ and the maximum admissible time difference $\Delta_M$ is obtained 2. It is immediately followed by an up to date 3 of the counters $C_1$ till $C_4$ i.e. most probably the counter corresponding to the case obtained will be incremented by one (weighting).

Then, a first comparison is performed 4 between the counter $C_4$ and its threshold to test if $C_4$ exceeds $S_4$. If it is the case, then the buffer size $B_s$ is increased 6 and the procedure is terminated 20. In the other case, a second comparison 5 is performed between the counter $C_3$ and its threshold $S_3$ and a similar action is taken as before if $C_3$ exceeds $S_3$.

If it is not the case, then a third comparison 7 is performed between the counter $C_1$ and its threshold $S_1$. If $C_1$ exceeds $S_1$, then this time the buffer size $B_s$ is diminished 8 and the procedure is terminated 20. In the other case, it is checked 9 if the drift or difference between said value $\Delta T$ and the maximum admissible time difference $\Delta_M$ is bigger then a packet or frame. If yes, then a resynchronization of the clock of both sender and receiver are performed 10 such to improve the communication between the sender and the receiver and the procedure is terminated 20.

If the check at step 9 was not successful, then it is checked how many frames or packets where already treated 11. If more then some predefined value $N_{max}$ were already treated then the procedure is terminated 20. If not then a supplementary comparison 12 is made between the counter $C_2$ and its threshold $S_2$. If that counter $C_2$ exceeds $S_2$ then it is checked 13 if the drift or difference between said value $\Delta T$ and the maximum admissible time difference $\Delta_M$ is bigger then e.g. half of a packet or frame. If yes, a resynchronization as in step 10 is performed but then afterwards all the counters $C_1$ till $C_4$ are reset 14 by e.g. dividing their value by four. In the other case, the reset of the counters 14, as said before, are performed directly.

The predefined value $N_{max}$ defines the period during which the counters are calculated. It measures the number of packets or frames treated. At the end of that period, if no action was taken, then a stable operating state is attained. The counters are no more reset but only divided by some amount e.g. by four to obtain a smoothing effect.

Generally, the threshold $S_1$ is much bigger then $S_3$ or $S_4$. This implies that the reaction time is much shorter for increasing the buffer size $B_s$ than to diminish it. This is related to the wish to react rapidly to some degradation in the transfer of the data stream over the packet-switched network. On the other hand, a reaction must not be so fast when an improvement is noticed. Indeed, a to big reduction of the buffer size must be avoided after a short improvement since this would lead, later on, to some lost of data. Indeed, if the buffer size $B_s$ will be to strongly shorten, not enough time will be left between the emptying of that buffer and the receiving of new packets ending up by the lost of latter packets.

In the above example according to the present invention, up to seven parameters must be set before starting: $\Delta_1$, $\Delta_2$, $S_1$, $S_2$, $S_3$, $S_4$, $N_{max}$. Occasionally, also $B_s$ must be set, if the procedure shall start with a non-zero buffer size. The value of all these parameters are obtained by some experiment and depending on the used packet-switched network. The aim is to find values such that on one side only a minimal supplementary delay (jitter) is tolerated and on the other side a lost of data is kept to a minimum (e.g. a lost of ~2% of data is not heard with a G.723 compression). The QoS during communication when using present method of an auto-adaptive buffering is noticeable increased in comparison to the use of fixed buffer, and kept at that high level even in a case of bad transfer situation thanks to this auto-adaptive buffer.

The above example does not exclude a method according to the present invention having different predefined criteria as the above one i.e. different parameters to set for the test of the size of the buffer $B_s$.

What is claimed is:

1. Method of buffering a data stream at its reception, said data stream being transferred from a sender to a receiver over a connection-less network in packets encapsulated into frames, the method comprising the steps of:

storing said packets into a buffer of a specific size ($B_s$), and characterized in that said method comprises the supplementary steps of:

measuring the delay (jitter) of at least one of said packets, performing a comparison between said measured and a predefined delay, depending on the result of the previous step, adapting dynamically said buffer size ($B_s$) such to optimize said transfer of said packets according to some predefined criteria.

2. Method according to claim 1, characterized in that in said step where a comparison is performed, a measured time difference ($\Delta T$) between the real time and the expected one for said transfer of said packet is compared with a maximum admissible time difference ($\Delta_M$) which corresponds to said buffer size ($B_s$).

3. Method according to claim 2, characterized in that it comprises a further step each time such comparison is performed of affecting its result to one of different cases according to said predefined criteria such to weight said different cases ($C_i$) relatively to the number of time a result of said comparison was affected to one of said cases.

4. Method according to claim 3, characterized in that it comprises a further step of comparing the obtained weights ($C_i$) with corresponding predefined one ($S_i$).

5. Method according to claim 4, characterized in that it comprises a further step of taking an action on the size of the buffer ($B_s$) when a calculated weight ($C_i$) exceeds the corresponding predefined one ($S_i$).

6. Method according to claim 5, characterized in that in said predefined criteria at least three different cases are defined, a first one (i) corresponding to the situation that said measured time difference ($\Delta T$) is noticeably less than said maximum admissible time ($\Delta_M$), a second one (ii) corresponding to the situation that both are of same amplitude, and a third one (iii) corresponding to the situation that said measured time difference ($\Delta T$) is noticeably greater then said maximum admissible time ($\Delta_M$).

7. Method according to claim 6, characterized in that said action corresponds in said first case (i) or said third case (iii) respectively to lower or to increase the buffer size ($B_s$) of some amount.

8. Method according to claim 6, characterized in that said action corresponds in said second case (ii) to resynchronize together the clock of both sender and receiver such that in a same interval of time, a same amount of data is at least approximately transmitted by said sender as received by said receiver.

9. Method according to claim 1, characterized in that when adapting dynamically said buffer size ($B_s$), its size is changed such that at least more than two sizes can be chosen or the change is made continuously in steps of a minimum size.

10. Method according to claim 9, characterized in that said minimum size being defined by the minimum resolution of said buffer.

* * * * *